United States Patent
Zoiss

[11] 3,918,218
[45] Nov. 11, 1975

[54] FILAMENTARY CUTTING TOOL CONTAINING SOLID MICROPARTICLES AND METHOD OF MAKING IT

[75] Inventor: Melvin Howard Zoiss, Oaklawn, Ill.

[73] Assignee: Barnes Drill Co., Rockford, Ill.

[22] Filed: Oct. 16, 1972

[21] Appl. No.: 297,862

Related U.S. Application Data

[63] Continuation of Ser. No. 72,970, Sept. 17, 1970, abandoned, which is a continuation-in-part of Ser. No. 868,976, Oct. 16, 1969, which is a continuation-in-part of Ser. No. 741,718, July 1, 1968, abandoned.

[52] U.S. Cl. ................................... 51/298; 51/295
[51] Int. Cl.² ........................................ C09K 3/14
[58] Field of Search ........ 51/293, 295, 298; 264/24, 264/108, 128

[56] References Cited
UNITED STATES PATENTS

| | | |
|---|---|---|
| 2,649,034 | 8/1953 | Gramelspacher .................. 264/108 |
| 2,992,956 | 7/1961 | Bazinet, Jr. ........................ 264/108 |
| 3,260,582 | 7/1966 | Zimmer ................................ 51/293 |
| 3,495,960 | 2/1970 | Schladitz ............................. 51/298 |
| 3,529,945 | 9/1970 | Charvat ............................... 51/298 |
| 3,547,608 | 12/1970 | Kitazawa ............................. 51/298 |

*Primary Examiner*—Donald J. Arnold
*Attorney, Agent, or Firm*—Wolfe, Hubbard, Leydig, Voit & Osann, Ltd.

[57] ABSTRACT

A filamentary cutting tool in which a plurality of cutting filaments are embedded in a matrix which is wearable but also wear-resistant and includes a mixture of microparticles and a thermosetting plastic. In some instances, the matrix may also include sheets of glass cloth or the like.

10 Claims, 7 Drawing Figures

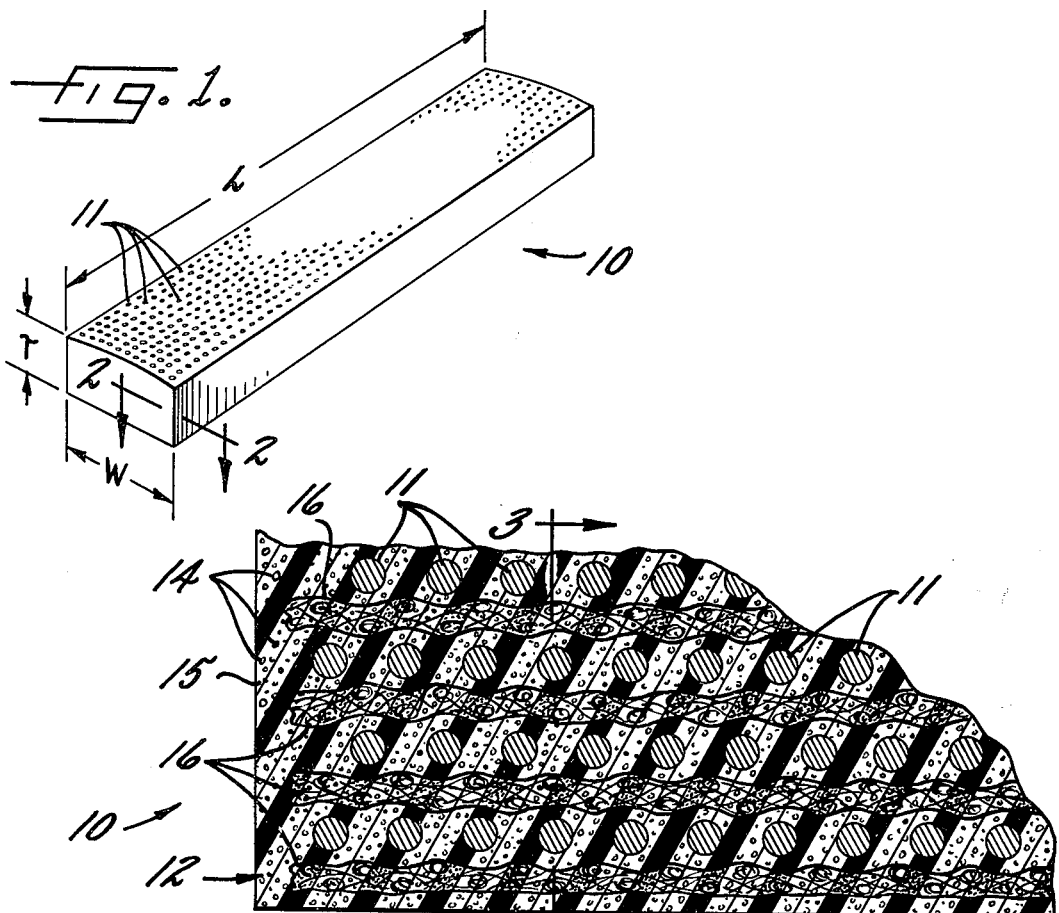
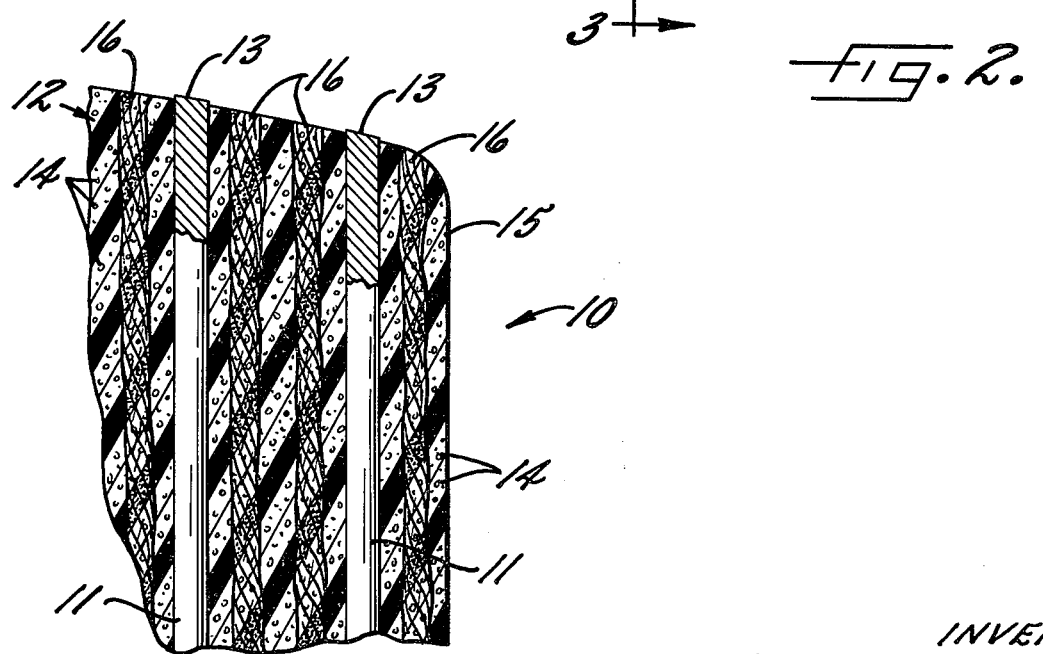

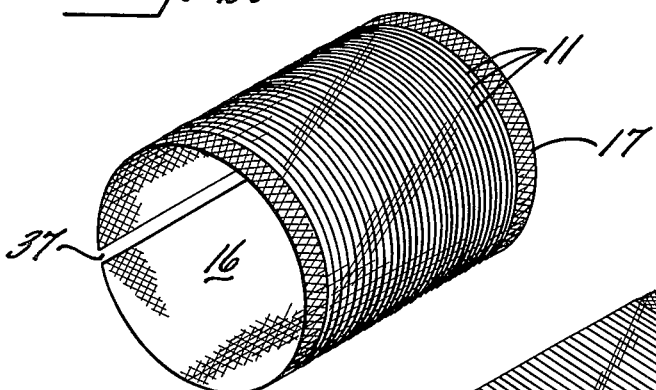
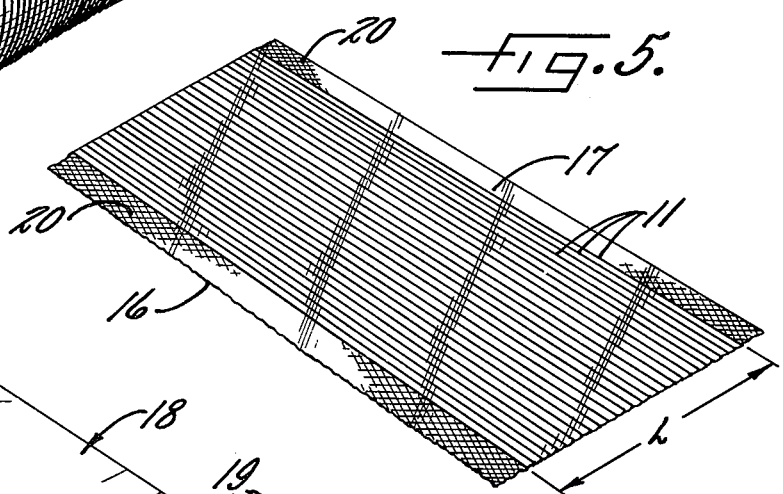
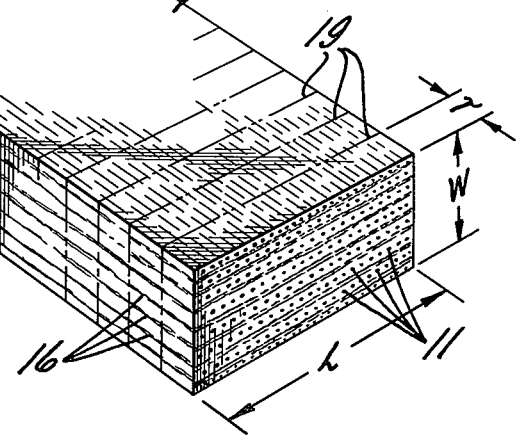
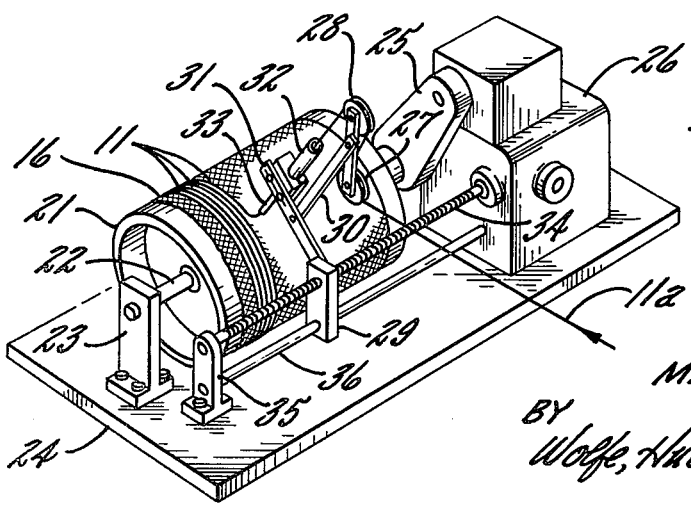

FILAMENTARY CUTTING TOOL CONTAINING SOLID MICROPARTICLES AND METHOD OF MAKING IT

RELATED APPLICATIONS

This application is a continuation application of Ser. No. 72,970, filed Sept. 17, 1970 now abandoned, which is in turn a continuation-in-part of my copending application Ser. No. 868,976, filed Oct. 16, 1969, which in turn is a continuation-in-part of my application Ser. No. 741,718, filed July 1, 1968, now abandoned.

BACKGROUND OF THE INVENTION

This invention relates to a cutting tool in which the cutting operation is performed by a plurality of elongated filaments embedded in a matrix. The ends of the filaments project through the matrix which wears away as the filaments wear during the cutting operation.

SUMMARY OF THE INVENTION

The general object of the invention is to provide new and improved filamentary cutting tool with a matrix which is both wearable and wear resistant so that it does not fragment or spall during the cutting operation.

A more detailed object is to achieve the foregoing by making the matrix of a mixture of microparticles and a thermosetting resin.

The invention also resides in the novel method of making the tool.

BRIEF DESCRIPTION OF THE DRAWINGS

FIG. 1 is a perspective view of a tool embodying the novel features of the present invention.

FIG. 2 is an enlarged fragmentary sectional view taken along the line 2—2 in FIG. 1.

FIG. 3 is a fragmentary sectional view taken along the line 3—3 in FIG. 2.

FIG. 4 is a perspective view of a sheet which is used to form one layer of the tool.

FIG. 5 is a perspective view of the sheet of FIG. 4 flattened out.

FIG. 6 is a perspective view of a block which is made from a stack of sheets and from which a plurality of tools are cut.

FIG. 7 is a perspective view of the apparatus for making the sheets.

DETAILED DESCRIPTION OF THE PREFERRED EMBODIMENT

While the invention is applicable to various types of cutting tools including rotary tools which replace grinding wheels, it is shown in the drawings as embodied in a tool 10 for honing cylindrical bores and is adapted to replace the customary vitrified honing stone with improved machining results and an appreciably longer work life. In general, the invention relates to a tool in which filaments or fibers 11 are embedded in a matrix 12 with the ends 13 of the filaments being exposed at the surface of the tool (see FIG. 3) to perform a cutting operation on a workpiece. Tools of this general type are disclosed in my copending application Ser. No. 868,976, filed Oct. 16, 1969. As set forth in said application, the matrix is solid and relatively rigid. Also, suitable materials for the filaments are metals, metaloids, metal oxides and intermetallic compounds. Specific examples include boron fibers formed by vapor deposition of boron on tungsten filaments, boron nitride, boron carbide, silicon carbide, titanium carbide, alumina, tungsten carbide, zirconia, titanium diboride and silica-substrate boron. To be effective as cutting filaments, the latter must be harder than the workpiece and the difference in hardness should be at least 250 as measured on the Knoop scale.

The present invention contemplates the provision of a novel matrix 12 which is both wearable and wear-resistant, that is, it will wear away to keep the ends of the filaments 11 exposed as the latter wear but it will not fragment or spall and thus maintains a proper holding of the filaments and prevents other objectionable effects on the cutting operation. To these ends, the matrix is made up of microparticles 14 bonded together by a thermosetting plastic 15. In the embodiment illustrated, sheets 16 of cloth (e.g. - glass or the like which serves as a carrier) impregnated with the microparticles and the plastic may be used to aid in properly spacing the filaments 11, both within an individual row or layer and also from layer to layer.

Stated another way, while the present invention could perhaps be used in connection with steel filaments which exhibit conventional wear properties, this invention finds its most advantageous utility in connection with cutting filaments that may be considered as consumable. More specifically, as opposed to the rather uniform, smooth gentle wear involved with steel, a consumable cutting filament such as a boron-coated tungsten filament is relatively brittle and tend to microscopically fracture in use.

The present invention provides a matrix having microparticles embedded therein which are present in an amount and size to allow the matrix to wear away in use as the cutting filaments microscopically fracture to keep the ends of the filaments exposed as well as preventing fragmenting and spalling of the matrix.

The amount and size of the microparticles which are used can accordingly vary within wide limits, so long as the matrix-microparticle composite functions in the manner as has been described herein. For example, considering only the resin material and the microparticles, the microparticles could perhaps comprise 75% by weight. More typically, however, with the use of glass microspheres as the microparticles, the glass microspheres might comprise anywhere from about 15 to about 30 percent of the resin-microsphere total weight.

While various materials such as nonmetallics (e.g. - sand, carbon and perhaps mica) and metals may be used to form the microparticles 14, glass has been found to be particularly convenient and effective. Also, it has been found that a spherical shape is convenient for the microparticles; and, thus, glass microspheres are used in the preferred embodiment, and their diameters are typically about 44 microns or less, a micron being one one-millionth of a meter. For example, suitable types consist of particles all being of a size less than 50 microns with (50% by weight) an average particle size of 20 or 30 microns.

With respect to selection of the plastic 15 serving as the matrix material, as set forth in my copending application, Ser. No. 868,976, it will be sufficient to state that conventional materials may be used. For optimum performance, the material should be tough and should wear away to maintain the exposure of fiber ends for engagement with the work without excessive breaking away behind the fibers, and should prevent excessive movement of the fibers within the matrix. Polyimide materials and epoxies such as epoxy novolacs have been shown to be satisfactory for these purposes.

While high-temperature resistance is necessary this is less critical than has been the case in some types of conventional tools. The heat-conducting characteristics of tools in accordance with the present invention may perhaps be improved, but the significant factor is that tools made in accordance with this invention simply do not develop any substantial amount of frictional heat in use.

In the illustrated form, the filaments may be round with diameters of approximately 0.007 inch and spacing between filaments in each row, and between adjacent rows, on the order of 0.020 inch. These are only representative examples, and the size of the filaments and the spacing between adjacent filaments can vary within wide limits. Boron-coated tungsten filaments having a diameter of about 0.005 inch and spaced from about 2 to 4 mils apart may also be employed.

The size and spacing of the filaments will generally be affected by the characteristics of the workpiece involved. Desirably, these parameters will be coordinated to provide an optimum relationship between the cutting rate on the workpiece and the rate of wear of the filaments.

With the matrix including glass microspheres 14, the latter wear gradually during the cutting operation without breaking away from the matrix; and there is little or no spalling of the matrix. Initially the ends 13 of the filaments may be flush with the matrix but, prior to the tool being used, the matrix may perhaps be recessed as, for example, by an abrading operation so that ends of the filaments project a few thousandths of an inch beyond the matrix as shown in FIG. 3. Indeed, use of the tool during an initial break-in period can cause the matrix to wear away slightly to expose the ends of the filaments to the desired degree. In use, the filaments and the matrix wear at about the same rate.

While the tool 10 of the present invention is suitable for a number of different cutting operations, one of its important uses is to replace abrading tools such as honing stones and grinding wheels. One of the principal advantages of the tool is the increased work life. For example, tests have shown that the tool lasts 20 to 30 times longer than the vitrified honing stones most conventionally in use. Another important advantage is that the tool effectively cuts the workpiece upon the application of a comparatively low pressure. In honing, for example, the pressure is on the order of about 60 to 100 pounds per square inch as compared to the 300 pounds per square inch or greater used with vitrified honing stones and this virtually eliminates the possibility of distorting the workpiece.

The invention also contemplates the provision of a novel method of making a tool 10 of the type shown in FIG. 1. In general, this method comprises the steps of coating the cutting filaments 11 with a mixture of the liquid thermosetting plastic 15 and the microparticles 14, placing the filaments on a sheet of the cloth 16 at spaced intervals with the filaments parallel to each other, heating the plastic to form a composite sheet 17 (FIG. 5) of cloth, filaments, microparticles and plastic, forming a plurality of similar composite sheets, stacking the sheets one on top of the other as illustrated in FIG. 6 with the filaments of all the sheets extending in the same direction, and bonding the sheets together to form a block 18.

While the block 18 may be the same size as the cutting tool 10, usually it is more practical to make the block considerably larger and cut it along the lines 19 to form the individual tools. In such a case, the filaments are oriented so that their ends may be exposed to sight at the ends of the block; and the cuts are made across the block. Thus, as shown in FIGS. 1 and 5, the length L of the tool is the width of each sheet 17, the margins 20 of the sheet as originally formed being trimmed before the sheets are stacked as will be explained later. Also, the width W of the tool is the height of the block 18 (see FIG. 6) and the thickness T is the thickness between the cuts 19.

As illustrated in FIGS. 4 and 7, the sheets 17 may be formed initially as a cylinder on a horizontal drum 21. The latter is fast on a shaft 22 which is journaled at one end in a bracket 23 upstanding from a base plate 24. The other end of the shaft is driven by a speed reducer 25 which, in turn, is driven by a motor 26. A sheet 16 of cloth is wrapped around the drum and the filaments are formed from a continuous strand of wire 11a. The latter is drawn from a source (not shown) around idler pulleys 27 and 28 which are supported on a nut 29 by means of rigid arms 30 and 31. From the pulley 28, the wire passes through a reservoir 32 on the arm 31 and a needle 33 and onto the cloth covered drum. The reservoir contains a mixture of the microparticles 14 and the thermosetting plastic 15 in its liquid form. The nut 29 is threaded on a horizontal screw 34 extending alongside the drum 21 with one end driven by the motor 26 and the other end journaled in a bracket 35 on the plate 24. A rod 36 parallel to the screw 34 projects through the nut 29 and has its ends anchored on the bracket 35 and the housing of the motor 26 to prevent the nut from turning and cause the nut to travel along the drum as the screw is turned.

In operation, a sheet 16 of cloth is wrapped around and secured to the drum 21 and the wire 11a is threaded around the pulleys 27 and 28 and through the reservoir 32 and needle 33 and its end is attached to the drum. The motor 26 is started and this causes the drum and the screw 34 to turn. As a result, the nut 29 travels along the screw from left to right as viewed in FIG. 7 and this wraps the wire around the drum in turns equally spaced apart. As the wire passes through the reservoir 32, it is coated with the mixture of microparticles 14 and plastic 15. In some instances, this coating may be sufficient to impregnate the cloth 16 while leaving a residual coating on the wire. In other cases, it may be desirable to apply the mixture to the cloth before the wire is wound.

The plastic is heated to set and then the composite cylinder on the drum is cut as indicated at 37 in FIG. 4. The cylinder then is unrolled and the margins 20 trimmed to form one of the composite sheets 17. The process is repeated until there are enough sheets, when stacked, to produce the dimension W. Bonding material is deposited on the sheets and this material may be the same mixture of microparticles 14 and liquid plastic 15 as is contained in the reservoir 32. Next, the stack is heated under molding pressure to set the plastic, laminate the sheets together and form the block 18. The block is then finally cut along the lines 19 to produce the tools 10.

It should be appreciated that it is particularly desirable to form a matrix composite in which the microparticles are homogenously dispersed in the resin material. Accordingly, as a further method which is particularly advantageous, each cloth sheet may be coated or impregnated with the resin-microparticle mix; and dry filaments (i.e. - containing no resin coating) may be embedded into the cloth by winding with the spacing as desired. The thus-formed cloth-cutting filament resin-microparticle composite may then be treated as in the other method, viz. - heating the resin to form a composite sheet, forming a plurality of similar sheets, stacking the sheets atop one another and molding under pressure and heat to form a block.

I claim as my invention:

1. In a filamentary cutting tool for use in performing a cutting operation on a workpiece comprising a matrix of a solid and relatively rigid thermosetting resin having embedded therein a plurality of elongated cutting filaments with a hardness of at least 250, as measured on the Knoop scale, greater than the workpiece all extending in substantially the same direction with the ends of the filaments being exposed at at least one surface of the matrix to cut a workpiece and wherein the matrix wears away in use to keep the ends of the filaments exposed, the improvement comprising a plurality of solid microparticles selected from the group consisting of glass, mica, metal, sand and carbon embedded in said matrix and present in an amount and size to allow the matrix to wear away in use and keep the ends of said filaments exposed while avoiding fragmenting and spalling of said matrix, the matrix with the microparticles embedded therein wearing away in use at about the same rate as the cutting filaments.

2. A tool as defined in claim 1 in which the microparticles are glass spheres and the resin is an epoxy resin.

3. In a filamentary cutting tool for use in performing a cutting operation on a workpiece comprising a plurality of layers of cloth, a plurality of elongated cutting filaments having a hardness of at least 250, as measured on the Knoop scale, greater than the workpiece and with some disposed between each of said layers and all extending in substantially the same direction and disposed generally in planes paralleling said layers, and a matrix of a solid and relatively rigid thermosetting resin embedded in said layers and surrounding said filaments, the ends of said filaments being exposed to cut a workpiece whereby the matrix wears away in use to keep the ends of the filaments exposed, the improvement comprising a plurality of solid microparticles selected from the group consisting of glass, mica, metal, sand and carbon embedded in said matrix and present in an amount and size to allow the matrix to wear away in use and keep the ends of said filaments exposed while avoiding fragmenting and spalling of said matrix, the matrix with the microparticles embedded therein wearing away in use at about the same rate as the cutting filaments.

4. A tool as defined in claim 3 in which said microparticles are glass spheres and the resin is an epoxy resin.

5. In the method of making a filamentary cutting tool for use in performing a cutting operation on a workpiece including forming a composite comprising a cloth having spaced cutting filaments parallel to each other thereon and held together with a liquid thermosetting resin which when cured is solid and relatively rigid, heating said resin to form a composite sheet of cloth, filaments, and resin, forming a plurality of similar composite sheets, stacking said composite sheets with the filaments of all the sheets extending in the same direction, and bonding said sheets together to form a unitary block, the improvement comprising adding solid microparticles selected from the group consisting of glass, mica, metal, sand and carbon to the liquid thermosetting resin with the microparticles being present in an amount and size to allow the matrix to wear away in use and keep the ends of said filaments exposed while avoiding fragmenting and spalling of the matrix and the matrix with the microparticles embedded therein wearing away in use at about the same rate as the cutting filaments.

6. The method as defined in claim 5 in which said block is cut successively in a direction across the filaments to form a plurality of tools from the block.

7. The method as defined in claim 5 in which said microparticles are glass spheres and said resin is an epoxy resin.

8. In a filamentary cutting tool comprising a matrix of a solid and relatively rigid thermosetting resin selected from the group consisting of polyimides and epoxy resins having embedded therein a plurality of elongated cutting filaments of a material selected from the group consisting of boron-coated tungsten, boron nitride, boron carbide, silicon carbide, titanium carbide, alumina, tungsten carbide, zirconia, titanium diboride and silica-substrate boron and all extending in substantially the same direction with the ends of the filaments being exposed at at least one surface of the matrix to cut a workpiece and wherein the matrix wears away in use to keep the ends of the filaments exposed, the improvement comprising a plurality of solid microparticles embedded in said matrix and present in an amount and size to allow the matrix to wear away in use and keep the ends of said filaments exposed while avoiding fragmenting and spalling of said matrix, said microparticles being a member selected from the group consisting of glass, sand, carbon mica and metal.

9. A tool as defined in claim 8 in which the solid microparticles are present in an amount of from about 15 to 75%, based upon the total weight of the resin and the microparticles, and the microparticles being of a size less than 50 microns.

10. A tool as defined in claim 8 in which the microparticles are glass microspheres and are present in an amount of from about 15 to about 30%, based upon the weight of the resin and the microspheres, and have an average particle size of from 20 to 30 microns.

* * * * *